US010825581B1

(12) United States Patent
Liao et al.

(10) Patent No.: US 10,825,581 B1
(45) Date of Patent: Nov. 3, 2020

(54) ENDOTHERMIC FIREPROOF CLADDING MATERIAL FOR ELECTRIC CABLES

(71) Applicant: NAN YA PLASTICS CORPORATION, Taipei (TW)

(72) Inventors: Te-Chao Liao, Taipei (TW); Chun-Che Tsao, Taipei (TW); Shih-Hsun Yen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/571,542

(22) Filed: Sep. 16, 2019

(30) Foreign Application Priority Data

Apr. 15, 2019 (TW) ............................ 108113077 A

(51) Int. Cl.
*B32B 7/02* (2019.01)
*H01B 7/295* (2006.01)
*H01B 7/29* (2006.01)

(52) U.S. Cl.
CPC ............ *H01B 7/295* (2013.01); *H01B 7/292* (2013.01)

(58) Field of Classification Search
CPC .. B32B 5/024; B32B 5/06; B32B 7/10; B32B 7/02; F16L 59/026; F16L 59/02
See application file for complete search history.

(56) References Cited

U.S. PATENT DOCUMENTS 6,051,193 A 4/2000 Langer et al.

FOREIGN PATENT DOCUMENTS

| | | | |
|---|---|---|---|
| CN | 202982995 | U | 6/2013 |
| CN | 103722814 | A | 4/2014 |
| EA | 200301054 | A1 | 4/2004 |
| JP | 2013510742 | A | 3/2013 |
| TW | M296139 | U | 8/2006 |
| TW | M308964 | U | 4/2007 |
| TW | 200811239 | A | 3/2008 |

*Primary Examiner* — Lawrence D Ferguson
(74) *Attorney, Agent, or Firm* — Li & Cai Intellectual Property (USA) Office

(57) ABSTRACT

An endothermic fireproof cladding material for electric cables, a cross-sectional structure of which is a two-layer or three-layer laminated composite structure in an integrated structure by coating, and one of the laminated structures has a fireproof fiber mesh cloth having a thickness of 0.03 mm to 0.24 mm as a coating and coating substrate. The fireproof fiber mesh cloth is selected from one of a glass fiber, a carbon fiber, a polyacrylonitrile (PAN) oxidized fiber, a ceramic fiber, a water-soluble alkaline earth fiber and an aromatic polyamide fiber.

7 Claims, 2 Drawing Sheets

ENDOTHERMIC FIREPROOF CLADDING MATERIAL FOR ELECTRIC CABLES

CROSS-REFERENCE TO RELATED PATENT APPLICATION

This application claims the benefit of priority to Taiwan Patent Application No. 108113077, filed on Apr. 15, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an endothermic fireproof cladding material, and more particularly to an endothermic fireproof cladding material for electric cables.

BACKGROUND OF THE DISCLOSURE

Generally, electric cables for households or buildings (hereinafter referred to as electric cables) are flammable plastic products or metal wire boxes containing flammable cable lines. When a fire occurs, they will not only promote the fire and generate smoke and harmful gases, but also become the main reason preventing people from escaping from the fire and causing equipment failure.

In order to solve the above issue, the electric cables and plastic pipelines of the buildings should be covered on the exterior with fireproof materials, which not only can suppress the rapid spread of flame, but can reduce a generation of smoke and harmful gases, thereby enabling personnel to have enough time to extinguish fire sources, seek help, activate firefighting equipment or escape from the fire. However, the fireproof material in the related art has a single-layer fireproof covering material or a multi-layer fireproof covering material, and both of them are not suitable for electric cables or plastic pipelines covering the buildings.

For example, the single-layer fireproof covering material of the related art is made of flame-resistant fiber, and has a flame-resistant fiber product such as PAN oxidized fiber, ceramic fiber or water-soluble alkaline earth fiber. These flame-resistant fibers are short fibers. Although they have excellent fire-proof functions, the mechanical strength thereof is worse than that of ordinary long fibers, which causes problems such as breakage and damage during transportation or construction. In particular, in order to prevent chipping and damage of the products, the exterior of these flame-resistant fiber products needs to be laminated with aluminum foil or aluminum sheets, so that softness and bendability of these flame-retardant fiber products are not good, and as a result, the products are not suitable for the electric cables or plastic pipes covering the buildings.

For example, in the related art, an optical cable and cable fire protection blanket provided by Chinese utility model patent CN202982995 (U) includes an inorganic fiber punched felt thermal insulating layer in the middle, and decoration layers made of inorganic fiber fabric in a composite mode on two sides. However, the fireproof blanket can only be used to cover and protect the optical cable, but cannot extend the period of effectiveness of the optical cables and the cables in the event of fire, resulting in equipment failure.

For example, in the related art, a multi-layer non-expanded fireproof material provided by Japanese Patent Publication No. JP20135010742A has a multilayer structure formed by wet molding through an inorganic fiber layer and a heat absorbing layer. However, the fireproof material has different thicknesses due to a formula of each layer and the thickness of each layer, so that the thickness is as large as 20-50 mm. In addition, the inorganic fiber layer and the heat absorbing layer need to be used separately, which are suitable for petroleum production and pipeline processing, and are not suitable for electric cables and plastic pipelines covering buildings.

For example, in the related art, a multi-layered expansion sheet provided by U.S. Pat. No. 6,051,193 can be used as a pollution control element and a fire-fighting device. Through a soft expandable layer and a non-intumescent layer, a multi-layer structure is formed by wet deposition using a paper-making machine. Although the multi-layer expansion sheet has flexibility, it has problems of poor bendability and excessive weight, and is still not suitable for electric cables and plastic pipes covering buildings.

SUMMARY OF THE DISCLOSURE

In response to the above-referenced technical inadequacies, the present disclosure provides an endothermic fireproof cladding material for electric cables, a cross-sectional structure of which is a two-layer or three-layer laminated composite structure in an integrated structure by coating, and one of the laminated structures has a fireproof fiber mesh cloth having a thickness of 0.03 mm to 0.24 mm as a coating and coating substrate. An upper side or a lower side of the fireproof fiber mesh cloth, or both sides of the upper side and the lower side thereof, are formed by an endothermic fire blocking layer having a thickness of 1 mm to 10 mm; that is, the endothermic fireproof cladding material for electric cables of the present disclosure includes the fireproof fiber mesh cloth and the at least one endothermic fire blocking layer. The fireproof fiber mesh cloth is selected from one of a glass fiber, a carbon fiber, a polyacrylonitrile (PAN) oxidized fiber, a ceramic fiber, a water-soluble alkaline earth fiber and an aromatic polyamide fiber. The material of the endothermic fire blocking layer includes 10 wt % to 30 wt % of heat resistant resin, 3 wt % to 10 wt % of heat resistant fiber, and 60 wt % to 80 wt % of inorganic flame retardant. The heat resistant resin is a glass fiber, a carbon fiber, a ceramic fiber, a water-soluble alkaline earth fiber or a combination thereof. The inorganic flame retardant is a hydroxide, an inorganic phosphorus compound, a nano layered silicate, a borate or a combination thereof.

In certain embodiments, the present disclosure provides the endothermic fireproof cladding material, and a thickness of the fireproof fiber mesh cloth is between 0.03 mm and 0.24 mm.

In certain embodiments, the present disclosure provides the endothermic fireproof cladding material, and the endothermic fire blocking layer having an endothermic effect has a thickness between 1 mm and 10 mm.

In certain embodiments, the present disclosure provides the endothermic fireproof cladding material, and the fireproof fiber mesh cloth has a warp and weft density of 55×53 to 10×10.

The endothermic fireproof cladding material for electric cables disclosed in the present disclosure has the characteristics of being soft, bendable, light weight and high strength, and is suitable for electric cables covering a building. The endothermic fireproof cladding material for electric cables can not only improve a flame resistance of the electric cables of the building, but also reduce a spread of fire and extend a use of lines and cable lines in electric cables.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
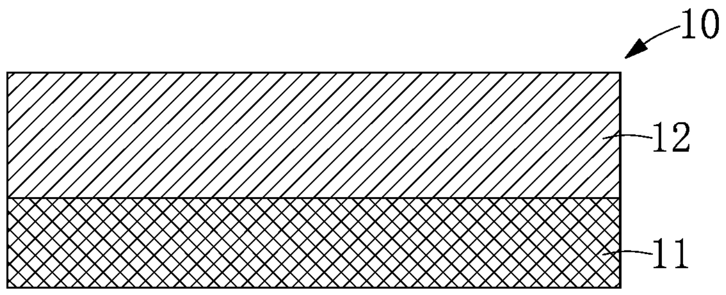
FIG. 1 is a schematic view of a two-layer laminated structure of the present disclosure, in which an endothermic fireproof cladding material for electric cables is integrated.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, an endothermic fireproof cladding material 10 provided by the present disclosure has a multilayer structure in a cross-sectional structure and is provided with a laminate of two or more layers. In particular, between adjacent different laminated structures in the multilayer composite structure, an integrated multilayer composite structure is formed by coating.

When the endothermic fireproof cladding material 10 of the present disclosure is formed into an integrated structure by coating, the mechanical strength and softness of the laminate can be adjusted by selecting a coating thickness, a bonding pressure, and adjusting an endothermic fire blocking layer formulation.

As shown in FIG. 1, the endothermic fireproof cladding material 10 of the present disclosure has a two-layer laminated structure, and is composed of a fireproof fiber mesh cloth 11 and an endothermic fire blocking layer 12. More specifically, the endothermic fire blocking layer 12 is laminated on an upper side or a lower side of the fireproof fiber mesh cloth 11 by coating, thereby forming the two-layer laminated structure having the integrated structure and excellent mechanical strength and softness.

In addition, since the endothermic fire blocking layer 12 is formed by coating, the endothermic fire blocking layer 12 is disposed on at least one side of the fireproof fiber mesh cloth 11, and the endothermic fire blocking layer 12 also penetrates into the gap between the fireproof fiber mesh cloth 11. Therefore, the endothermic fireproof cladding material 10 will have excellent mechanical strength and hardness. Moreover, compared with a conventional wet molding method, a problem of thickness adjustment can be solved, and a thickness can be adjusted according to fire prevention requirements.

Figure 2:
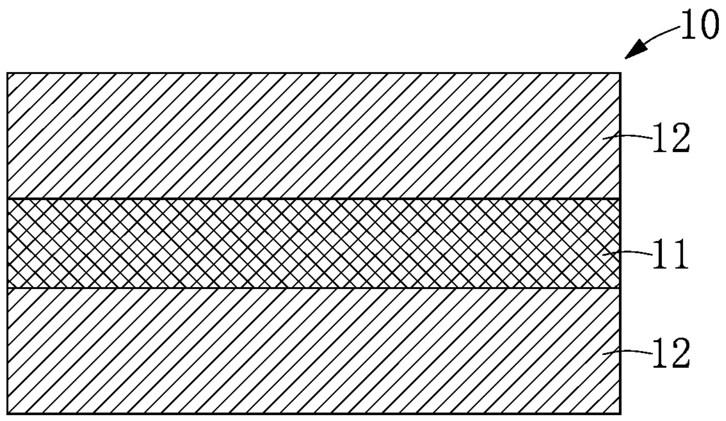
FIG. 2 is a schematic view of a three-layer laminated structure of the present disclosure, in which an endothermic fireproof cladding material for electric cables is integrated.

As shown in FIG. 2, the endothermic fireproof cladding material 10 of the present disclosure has a three-layer laminated structure, and is composed of one fireproof fiber mesh cloth 11 and two endothermic fire blocking layers 12. More specifically, the endothermic fire blocking layers 12 is superposed on an upper side and a lower side of the fireproof fiber mesh cloth 11 by coating, thereby forming the three-layer laminated structure having the integrated structure and excellent mechanical strength and softness.

Figure 3:
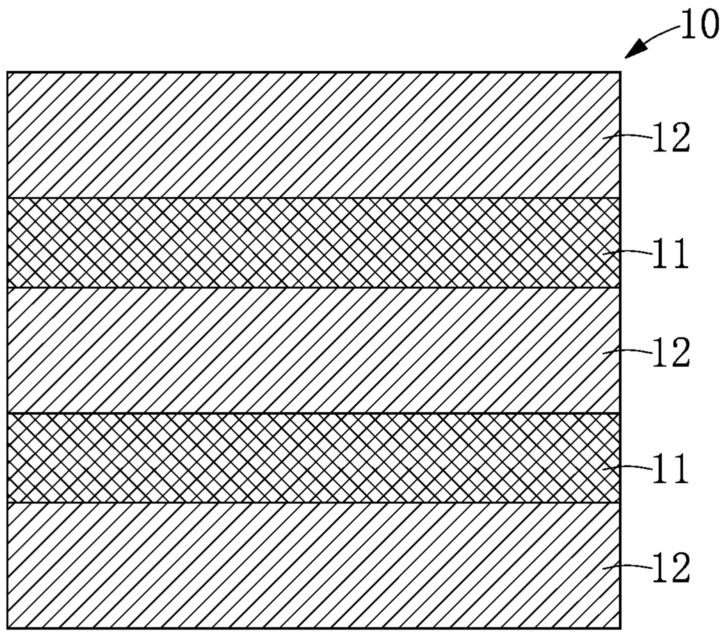
FIG. 3 is a schematic view of a five-layer laminated structure of the present disclosure in which an endothermic fireproof cladding material for electric cables is integrated.

As shown in FIG. 3, the endothermic fireproof cladding material 10 of the present disclosure has a five-layer laminated structure, and is composed of two fireproof fiber cloths and nets 11 and three endothermic fire blocking layers 12. More specifically, each of the fireproof fiber mesh cloth 11 is stacked in the middle of the two endothermic fire blocking layers 12 by coating, thereby forming the five-layer laminated structure having the integrated structure and excellent mechanical strength and softness.

Figure 4:
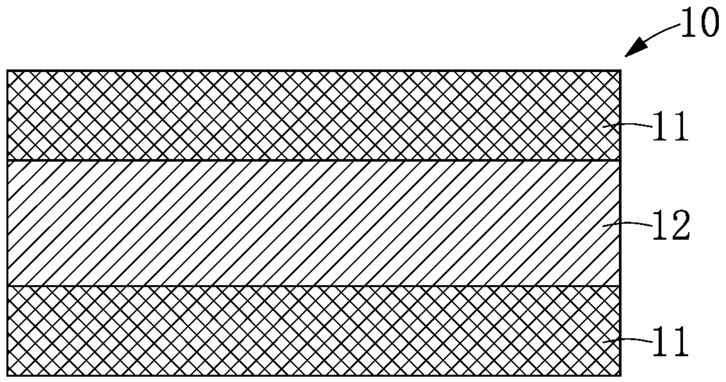
FIG. 4 is a schematic view of a three-layer laminated structure of the present disclosure, in which an endothermic fireproof cladding material for electric cables is integrated.

As shown in FIG. 4, the endothermic fireproof cladding material 10 of the present disclosure has a three-layer laminated structure, and is composed of two fireproof fiber cloths and nets 11 and one endothermic fire blocking layer 12. More specifically, the endothermic fire blocking layers 12 is superposed on an upper side and a lower side of the fireproof fiber mesh cloth 11 by coating, thereby forming the three-layer laminated structure having the integrated structure and excellent mechanical strength and softness.

The endothermic fireproof cladding material 10 of the present disclosure has a function of covering electric cables and plastic pipelines and fireproofing. A thickness of the fireproof fiber mesh cloth 11 is between 0.03 mm and 0.24 mm, preferably between 0.05 mm and 0.15 mm, and is selected from one of a glass fiber, a carbon fiber, a PAN oxidized fiber, a ceramic fiber, a water-soluble alkaline earth fiber and an aromatic polyamide fiber. The fireproof fiber mesh clothll has excellent flame resistance and heat insulation properties.

The endothermic fire blocking layer 12 has a thickness between 1 mm and 10 mm, preferably between 1.5 mm and 5 mm, and is composed of a heat resistant resin, such as a silicone resin, a fluorocarbon resin, or a combination thereof, a heat resistant fiber, such as a glass fiber, a carbon fiber, a ceramic fiber, or a water-soluble alkaline earth fiber, and inorganic flame retardant, such as hydroxide, inorganic phosphorus compound, nano layered silicate, or borate. The endothermic fire blocking layer 12 has excellent heat absorption and flame resistance. When the endothermic fire blocking layer 12 and the fireproof fiber mesh cloth 11 are integrally formed by coating, the fireproof fiber mesh cloth 11 is too thin, the support is insufficient, and the coating thickness cannot be increased. If the fireproof fiber mesh cloth 11 is too thick, the endothermic fireproof cladding material 10 would have poor tortuosity and cause chipping.

A warp and weft density of the fireproof fiber mesh cloth 11 (that is, the number of yarns per unit length of a cloth surface, expressed as "wpi×fpi") is between 55×53 and 10×10, preferably between 20×18 and 17×17, wherein "wpi (warps per inch)" refers to the number of warp yarns per 1 inch of the surface in a lateral direction, and "fpi (fillings per inch)" refers to the number of weft yarns per 1 inch of the surface in the longitudinal direction.

The higher the warp and weft density of the fireproof fiber mesh cloth 11 is, the stronger the mechanical strength is. However, when the endothermic fire blocking layer 12 and the fireproof fiber mesh cloth 11 are integrally formed by coating, an adhesion between the laminates is not good, and as a result, the mechanical strength of the finished product is rather lowered. If the warp and weft density of the fireproof fiber mesh cloth 11 is too low, the mechanical strength is insufficient, and the finished product is easily broken. Therefore, the present disclosure can achieve the effect of adjusting the mechanical strength by controlling the warp and weft density of the fireproof fiber mesh cloth 11.

Therefore, the endothermic fireproof cladding material 10 of the present disclosure has characteristics of being soft, bendable, light weight and high strength in addition to heat insulation and fireproofing properties, and is suitable for using in electric cables and plastic pipelines for covering buildings. When the endothermic fireproof cladding material 10 is on fire, the endothermic fireproof cladding material 10 can suppress or delay fire that burns the electric cables and plastic pipelines of the building, which helps to reduce a generation of smoke and harmful gases, and prolongs effectiveness of lines and cables in the electric cables.

The endothermic fireproof cladding material samples prepared in the embodiments and comparative examples are evaluated for physical properties of the endothermic fireproof cladding material according to the following test methods:

I. Tensile Strength (Kg/Cm$^3$) Test:

A test piece of the same size (length 150 mm and width 30 mm) is cut from a longitudinal direction and a lateral direction of the sample. A distance between upper and lower clamps of the tensile testing machine is adjusted to be 100±2 mm, the test piece is clamped with the clamp and pull down to a break at a speed of 200 mm±20 mm/min, and then a highest data is recorded.

II. 90° Bending Angle Test:

A test piece of the same size (length 150 mm and width 150 mm) is cut from a longitudinal direction and a lateral direction of the sample. The 90° bending angle test is performed by hand, and the appearance of the sample is observed to be abnormal or not such as cracking or peeling.

III. Flame Resistance Test:

A cone calorimeter is used to test a heat release rate of the material after various heating times in accordance with ASTM E 1354. Under a heating condition of 50 kW (kW)/m$^2$, the test materials are heated for 20 minutes, 10 minutes and 5 minutes respectively, and the flame resistance grade is determined according to the heating conditions of the test materials satisfying the following standards 1 to 3:

1. The total heat release rate of the material is 8 MJ (megajoules)/m$^2$ or less;
2. The maximum heat release rate exceeds 200 kW/m$^2$ for less than 10 seconds;
3. No cracks or holes appear on the back of the test material.

The heat resistance grade of the test materials is divided into the following three grades:

A. Heat resistance grade 1, which means that the test material can meet the above standard requirements 1 to 3 after heating for 20 minutes;

B. Heat resistance grade 2, which means that the test material can meet the above-mentioned specification standards 1 to 3 after heating for 10 minutes;

C. Heat resistance grade 3, which means that the test material can meet the above-mentioned specification standards 1 to 3 after heating for 5 minutes;

IV. Thermogravimetric Analysis at 1100° C.:

A thermogravimetric loss of the material is tested after heated at 1100° C. for different heating time by a high temperature furnace.

Embodiment 1

As shown in FIG. 1, an endothermic fireproof cladding material having a two-layer laminated structure is prepared by coating, and the laminated structure thereof includes a glass fiber cloth having a thickness of 0.02 mm and an endothermic fire blocking layer having a thickness of 1 mm. The glass fiber cloth has a warp and weft density of 17×17.

Physical properties are evaluated, and the results are shown in Table 1.

Embodiment 2

As shown in FIG. 2, an endothermic fireproof cladding material having a three-layer laminated structure is prepared by coating, and the laminated structure thereof includes an aromatic polyamide fiber net having a thickness of 0.1 mm and an endothermic fire blocking layer having a double thickness of 2 mm. The aromatic polyamide fiber net has a warp and weft density of 12.5×12.5.

Physical properties are evaluated, and the results are shown in Table 1.

Embodiment 3

As shown in FIG. 3, an endothermic fireproof cladding material having a five-layer laminated structure is prepared by coating, and the laminated structure thereof includes two glass fiber cloths having a thickness of 0.05 mm and each of the glass fiber cloth is coated with an endothermic fire blocking layer having a thickness of 2 mm. The glass fiber cloth has a warp and weft density of 20×10.

Physical properties are evaluated, and the results are shown in Table 1.

Embodiment 4

As shown in FIG. 4, an endothermic fireproof cladding material having a three-layer laminated structure is prepared by coating, and the laminated structure thereof includes two glass fiber cloths having a thickness of 0.05 mm and an endothermic fire blocking layer having a thickness of 2 mm. The glass fiber cloth has a warp and weft density of 17×15.

Physical properties are evaluated, and the results are shown in Table 1.

Comparative Example 1

A PAN oxidized fiber woven blanket with a thickness of 2 mm is taken as a single-layer structure fireproof covering material, and no longer composites an endothermic fire blocking layer.

Physical properties are evaluated, and the results are shown in Table 1.

Comparative Example 2

A two-layer structure heat-absorbing fireproof cladding material having a thickness of 10.02 mm commercially available is taken.

Physical properties are evaluated, and the results are shown in Table 1.

Comparative Example 3

As shown in FIG. 2, an endothermic fireproof cladding material having a three-layered layer structure is obtained by coating, and the laminated structure thereof includes a double-layered glass fiber cloth having a thickness of 0.02 mm and an endothermic fire blocking layer having a thickness of 3 mm. The glass fiber cloth has a warp and weft density of 56×56.

Physical properties are evaluated, and the results are shown in Table 1.

Comparative Example 4

As shown in FIG. 1, an endothermic fireproof cladding material having a two-layer laminated structure is prepared by coating, and the laminated structure thereof includes a carbon fiber cloth having a thickness of 0.3 mm and an endothermic fire blocking layer having a thickness of 1 mm. The carbon fiber cloth has a warp and weft density of 6.25×6.25.

Physical properties are evaluated, and the results are shown in Table 1.

TABLE 1

Composition and physical properties

| Composition | | Embodiment 1 | Embodiment 2 | Embodiment 3 | Embodiment 4 | Comparative Example 1 | Comparative Example 2 | Comparative Example 3 | Comparative Example 4 |
|---|---|---|---|---|---|---|---|---|---|
| fireproof fiber mesh cloth | Thickness of PAN oxidized fiber (mm) | — | — | — | — | 2 | — | — | — |
| | Thickness of glass fiber(mm) | 0.02 | — | 0.1 | 0.05 | — | — | 0.02 | |
| | Thickness of aromatic polyamide fiber net (mm) | — | 0.05 | — | — | — | — | — | |
| | Thickness of carbon fiber cloth (mm) | — | — | — | — | — | — | — | 0.3 |
| | Thickness of nylon fiber (mm) | — | — | — | — | — | 0.02 | | |
| | Number of layer | 1 | 1 | 2 | 2 | 1 | 1 | 2 | 1 |
| | Warp and weft density | 17 × 17 | 12.5 × 12.5 | 20 × 10 | 17 × 15 | — | — | 56 × 56 | 6.25 × 6.25 |
| endothermic fire blocking layer | Thickness (mm) | 1 | 2 | 3 | 2 | — | 10 | 3 | 1 |
| | heat resistant resin(wt %) | 20 | 10 | 20 | 30 | 0 | — | 10 | 30 |
| | heat resistant fiber(wt %) | 10 | 3 | 5 | 10 | 100 | — | 10 | 3 |
| | inorganic flame retardant(wt %) | 60 | 80 | 80 | 80 | 0 | — | 70 | 60 |
| | Number of layer | 1 | 2 | 3 | 1 | — | 1 | 1 | 1 |
| composite processing | coating | v | v | v | v | — | — | v | v |
| | wet molding | — | — | — | — | — | v | — | — |
| | Weaving | — | — | — | — | v | — | — | — |
| | Number of laminated structure | 2 | 3 | 5 | 3 | 1 | 2 | 3 | 2 |
| physical properties | Total thickness | 1.02 | 4.05 | 9.2 | 2.1 | 2 | 10.02 | 3.04 | 1.3 |
| | Longitudinal tensile strength (kg/cm$^3$) | 4.1 | 7.3 | 10.2 | 8.8 | 3 | 12.3 | 9.6 | 2.3 |
| | lateral tensile strength (kg/cm$^3$) | 4.5 | 7.8 | 10.8 | 9.2 | 5 | 11.8 | 10.1 | 2.1 |
| | 90? bending angle | OK | OK | OK | OK | OK | NG | NG | NG |
| | Flame resistance grade(cone calorimeter) | 1 | 1 | 1 | 1 | 2 | 1 | 1 | 1 |
| | 1100° C. Thermogravimetric analysis — 30 min thermogravimetric loss % | 27.7 | 27.9 | 28.2 | 27.8 | 80 | 34.8 | 28 | 32.2 |
| | 60 min thermogravimetric loss % | 28.6 | 28.4 | 28.8 | 28.4 | 90 | 35 | 28.3 | 33.6 |
| | 120 min thermogravimetric loss % | 29 | 28.6 | 30 | 28.9 | 95 | 35.6 | 28.8 | 34.8 |
| | 240 min thermogravimetric loss % | 30.6 | 29 | 31.2 | 29.1 | 98 | 36.1 | 29.2 | 36.5 |
| | Conclusive results | good | good | good | good | bad | fair | bad | bad |

In conclusion,

The endothermic fireproof cladding material of the two-layer laminated structure of the embodiment 1 is obtained by coating, and the laminated structure includes one glass fiber cloth having a thickness of 0.02 mm and one endothermic fire blocking layer having a thickness of 1 mm. The glass fiber cloth has a warp and weft density of 17×17. Compared with a single-layered layer fireproof covering material of the PAN oxidized fiber woven carpet of Comparative Example 1, flame resistant grade and thermogravimetric at 1100° C. of the endothermic fireproof cladding material of the embodiment 1 has effectively improved. In particular, the endothermic fireproof cladding material of the embodiment 1 has the characteristics of being soft, bendable, light weight and high strength, and is suitable for covering electric cables and plastic pipelines, and has a flame resistance grade of grade 1 and after 1100° C. calcination, its thermogravimetric loss is less than 40%. In addition to helping to reduce a generation of smoke and harmful gases, an effectiveness of lines and cables in electric cables also extends.

The endothermic fireproof cladding material of the two-layer laminated structure of the embodiment 1 is obtained by coating, and the laminated structure includes one glass fiber cloth having a thickness of 0.02 mm and one endothermic fire blocking layer having a thickness of 1 mm. The glass fiber cloth has a warp and weft density of 17×17. Compared with the endothermic fireproof cladding material of Comparative Example 4, although the same endothermic fire blocking layer, a carbon fiber cloth having a thickness of 0.3 mm and a warp and weft density of 6.25×6.25 is used, and the flame resistance grade and the thermogravimetric at 1100° C. is comparable, the mechanical strengths such as tensile strength and tortuosity have been effectively improved. It also shows that the carbon fiber cloth should have a warp and weft density not less than 10×10 and a thickness less than 2.4 mm.

The endothermic fireproof cladding material of the three-layer laminated structure of the embodiment 2 is obtained by coating, and in addition to the two endothermic fire blocking layers the laminated structure also includes one aromatic polyamide fiber net having a thickness of 0.05 mm and a warp and weft density of 12.5×12.5. Compared with the endothermic fireproof cladding material of Comparative Example 3, although the same two endothermic fire blocking layer, a carbon fiber cloth having a thickness of 0.05 mm and a warp and weft density of 56×56 is used, and the flame resistance grade and the thermogravimetric at 1100° C. is comparable, the endothermic fireproof cladding material of embodiment 2 is not broken or peeled off under 90° bending angle, indicating that the warp and weft density of the glass fiber cloth should not be higher than 55×53.

The commercially available endothermic fireproof cladding material of Comparative Example 2 is obtained by a wet molding method as a two-layer structure heat-absorbing fireproof cladding material having a thickness of up to 10 mm. Compared with the endothermic fireproof covering material of the five-layer laminate structure having a thickness of 9.2 mm of the embodiment 3 obtained by coating, although the flame resistance grade and the thermogravimetric at 1100° C. is comparable, the endothermic fireproof cladding material of the embodiment 3 is not broken or peeled off under 90° bending angle. Therefore, the endothermic fireproof cladding material of the embodiment 3 is more suitable for covering electric cables and plastic pipelines. In addition to helping to reduce a generation of smoke and harmful gases, an effectiveness of lines and cables in electric cables also extends.

The endothermic fireproof cladding material of the three-layer laminated structure of the embodiment 4 is obtained by coating, in addition to one endothermic fire blocking layer, the laminated structure also includes two glass fiber cloth having a thickness of 0.05 mm and a warp and weft density of 17×15. The endothermic fireproof cladding material of the embodiment 4 has excellent tensile strength and tortuosity, and a flame resistance grade of grade 1 and after 1100° C. calcination, and its thermogravimetric loss is less than 40%. In addition to helping to reduce a generation of smoke and harmful gases, an effectiveness of lines and cables in electric cables also extends.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An endothermic fireproof cladding material for electric cables, comprising:

a laminated structure including a fireproof fiber mesh cloth having a thickness between 0.03 mm and 0.24 mm, and at least one endothermic fire blocking layer having a thickness between 1 mm and 10 mm;

wherein the material of the endothermic fire blocking layer includes 10 wt % to 30 wt % of heat resistant resin, 3 wt % to 10 wt % of heat resistant fiber, and 60 wt % to 80 wt % of inorganic flame retardant, based on the total weight of the endothermic fire blocking layer; and wherein the endothermic fireproof cladding material has a flame resistant grade of class 1 and is calcined at 1100° C., and a thermogravimetric loss is less than 40%.

2. The endothermic fireproof cladding material for electric cables according to claim 1, wherein the fireproof fiber mesh cloth has a warp and weft density of 55×53 to 10×10.

3. The endothermic fireproof cladding material for electric cables according to claim 1, wherein the fireproof fiber mesh cloth is a glass fiber, a carbon fiber, a polyacrylonitrile oxidized fiber, a ceramic fiber, a water-soluble alkaline earth fiber or an aromatic polyamide fiber.

4. The endothermic fireproof cladding material for electric cables according to claim 1, wherein the heat resistant resin is a silicone resin, a fluorocarbon resin, or a combination thereof.

5. The endothermic fireproof cladding material for electric cables according to claim 1, wherein the heat resistant fiber is a glass fiber, a carbon fiber, a ceramic fiber, a water-soluble alkaline earth fiber or a combination thereof.

6. The endothermic fireproof cladding material for electric cables according to claim 1, wherein the inorganic flame retardant is a hydroxide, an inorganic phosphorus compound, a nano layered silicate, a borate or a combination thereof.

7. The endothermic fireproof cladding material for electric cables according to claim 1, wherein the endothermic fire blocking layer is formed on the fireproof fiber mesh cloth by coating.

* * * * *